US012364882B2

(12) United States Patent
Jacotey et al.

(10) Patent No.: US 12,364,882 B2
(45) Date of Patent: Jul. 22, 2025

(54) CONTROL ASSEMBLY FOR A BREATHING MASK OF AN AIRCRAFT CREW MEMBER

(71) Applicant: SAFRAN AEROTECHNICS, Plaisir (FR)

(72) Inventors: Jérémy Jacotey, Moissy-Cramayel (FR); Didier Lamourette, Moissy-Cramayel (FR); Serge Moreira, Moissy-Cramayel (FR)

(73) Assignee: SAFRAN AEROTECHNICS, Plaisir (FR)

( * ) Notice: Subject to any disclaimer, the term of this patent is extended or adjusted under 35 U.S.C. 154(b) by 683 days.

(21) Appl. No.: 17/782,309

(22) PCT Filed: Dec. 8, 2020

(86) PCT No.: PCT/FR2020/052344
§ 371 (c)(1),
(2) Date: Jun. 3, 2022

(87) PCT Pub. No.: WO2021/116597
PCT Pub. Date: Jun. 17, 2021

(65) Prior Publication Data

US 2023/0041231 A1 Feb. 9, 2023

(30) Foreign Application Priority Data

Dec. 9, 2019 (EP) .................................... 19306606

(51) Int. Cl.
*A62B 9/00* (2006.01)
*A62B 7/14* (2006.01)

(52) U.S. Cl.
CPC . *A62B 9/00* (2013.01); *A62B 7/14* (2013.01)

(58) Field of Classification Search
CPC .... A62B 7/14; A62B 9/00; A62B 9/02; F16K 35/025
See application file for complete search history.

(56) References Cited

U.S. PATENT DOCUMENTS 4,054,133 A * 10/1977 Myers ............... A61M 16/0677 128/207.18
4,915,132 A * 4/1990 Hodge ................ F16K 11/0743 128/205.24

(Continued)

FOREIGN PATENT DOCUMENTS

EP 2732833 A1 * 5/2014 .......... A61M 1/0031
EP 2873433 A1 * 5/2015 ........ A61M 16/0463

(Continued)

OTHER PUBLICATIONS

English translation of Written Opinion mailed Apr. 15, 2021, issued in corresponding International Application No. PCT/FR2020/052344, filed Dec. 8, 2020, 6 pages.

(Continued)

*Primary Examiner* — Kathryn E Ditmer
(74) *Attorney, Agent, or Firm* — CHRISTENSEN O'CONNOR JOHNSON KINDNESS PLLC

(57) ABSTRACT

A control unit for an aircraft crew member's breathing mask, includes a support, a mode-selection knob pivotally mounted on a holder between at least a first position, a second position and a third position. A controller supplies a breathing cavity in three modes of operation depending on the position of the mode-selection knob. A locking/unlocking system includes an operating member moveable between a locking position and an unlocking position. The locking position blocks the rotation of the mode-selection knob from the second position to the third position, and the unlocking position allows rotation of the mode-selection knob from the second position to the third position.

15 Claims, 7 Drawing Sheets

(56) References Cited

U.S. PATENT DOCUMENTS

| | | | | | |
|---|---|---|---|---|---|
| 4,928,682 | A * | 5/1990 | Stevenson | A62B 9/022 128/205.24 |
| 5,207,641 | A * | 5/1993 | Allton | A61M 16/0463 604/32 |
| 5,746,199 | A * | 5/1998 | Bayron | A61M 16/20 128/205.24 |
| 5,913,307 | A * | 6/1999 | Taieb | A62B 18/08 128/205.24 |
| 2012/0017914 | A1* | 1/2012 | Watt Lanyau | A61M 16/04 128/207.14 |
| 2012/0080628 | A1* | 4/2012 | Buergi | F16K 35/025 251/249.5 |
| 2013/0306073 | A1* | 11/2013 | Fromage | A62B 9/022 128/204.22 |
| 2017/0235328 | A1* | 8/2017 | Swayne | F16K 35/025 74/532 |

FOREIGN PATENT DOCUMENTS

| | | | | |
|---|---|---|---|---|
| EP | 2937113 | A1 * | 10/2015 | A62B 18/02 |
| WO | WO-2012129736 | A1 * | 10/2012 | A62B 9/02 |
| WO | WO-2017044582 | A1 * | 3/2017 | A62B 18/006 |

OTHER PUBLICATIONS

International Preliminary Report on Patentability mailed May 17, 2022, issued in corresponding International Application No. PCT/FR2020/052344, filed Dec. 8, 2020, 7 pages.

International Search Report mailed Apr. 15, 2021, issued in corresponding International Application No. PCT/FR2020/052344, filed Dec. 8, 2020, 5 pages.

Written Opinion mailed Apr. 15, 2021, issued in corresponding International Application No. PCT/FR2020/052344, filed Dec. 8, 2020, 6 pages.

* cited by examiner

CONTROL ASSEMBLY FOR A BREATHING MASK OF AN AIRCRAFT CREW MEMBER

TECHNICAL FIELD OF THE INVENTION

The present disclosure relates to a control unit for an aircraft crew member's breathing mask.

PRIOR ART

In a known manner, such a control unit for an aircraft crew member's breathing mask comprises:

- a holder;
- a mode-selection knob pivotally mounted on the holder with respect to an axis of rotation, the axis of rotation being arranged perpendicular to said support; a radial direction, a transverse direction and the axis of rotation forming a direct trihedron; said selection knob being pivotable between at least a first position, a second position and a third position, the second position being positioned between the first position and the third position;
- a controller intended to be supplied by a source of breathing gas and adapted to supply a breathing cavity in at least three of the following modes of operation:

a) when the mode-selector switch is in the first position, the controller supplies the breathing cavity until the pressure in the breathing cavity exceeds a first relative pressure to the ambient pressure, b) when the mode-selector switch is in the second position, the controller supplies the breathing cavity as long as the pressure in the breathing cavity is not higher than a second pressure relative to the ambient pressure, the first pressure being higher than the second pressure, c) when the mode-selector switch is in the third position, the controller supplies the breathing cavity with breathing gas diluted with air. The first position "EMER" corresponds to the "EMERGENCY" mode. It should be selected in case of smoke or fire in the cockpit. The second position "100%" corresponds to the "100%" mode. It offers protection against hypoxia. The third position "N" corresponds to the "NORMAL" mode. It allows you to limit the consumption of oxygen in preventive wear or on a landing in a descent profile. The selection button defaults to the second 100% position. The second position 100% is centrally located between the first and third positions.

The mode-selection button is not visible to the user when the mask is worn. Currently, the selection knob is asymmetrical to allow the user to distinguish between the direction of rotation leading to "EMERGENCY" and "NORMAL" mode by touch. The selection button also has side markings to allow verification of the selected mode by a third party. For example, current breathing masks have means of providing information about the selected mode of operation to the user, through the asymmetry of the button, and to third parties, through the side markings.

Despite this asymmetry, without significant knowledge and frequent use of the breathing mask, it is difficult to know the direction of rotation leading to the "EMERGENCY" and "NORMAL" modes. In particular, in the event of a sudden emergency, the user may accidentally turn the selector switch to "NORMAL" mode and lose protection against toxic fumes and gases. The user may select the wrong mode of operation if the information is poorly assimilated or if he/she reacts in haste.

DISCLOSURE OF THE INVENTION

The purpose of the present disclosure is to provide a control system that prevents accidental selection of the "NORMAL" mode instead of the "EMERGENCY" mode. The purpose of the present disclosure is to increase the level of safety of oxygen mask control assemblies by preventing misuse of the mode-selector switch.

SUMMARY OF THE INVENTION

The invention relates to a control unit for a respiratory mask comprising at least one locking-unlocking device adapted to lock and/or unlock the rotation of the mode-selection knob; the locking-unlocking device comprising a maneuvering member adapted to be moved between a locking position and an unlocking position; the locking position blocking the rotation of the mode-selection knob from the second position to the third position, the unlocking position authorising the rotation of the mode-selection knob from the second position to the third position. Advantageously, the present disclosure mechanically prevents the selection of a wrong operating mode.

The features outlined in the following paragraphs can optionally be implemented. They can be implemented independently or in combination with each other:

- the operating member comprises a locking finger extending in the radial direction, the locking finger comprising a substantially transverse groove, and wherein the locking-unlocking device further comprises a projection carried by said holder, said projection being capable of abutting against a first lateral face of the locking finger to lock the rotation towards the third position, when the operating member is in the locking position the projection being suitable for passing through the said groove to allow rotation of the mode-selection knob towards the third position, when the operating member is in the unlocking position.
- the operating member is adapted to move in the radial direction, after pressing on an operating area of the operating member, and wherein the locking-unlocking device comprises a first stop adapted to stop the movement of the operating member, when the groove is opposite the projection.
- the first stop is arranged at an end face of the locking finger at a distance from the projection substantially equal to the distance between the groove and the end face of the locking finger.
- the first stop is arranged on the holder.
- the locking/unlocking system comprises a second stop suitable for stopping the rotation of the mode-selection knob from the second position to the first position, when the operating member is in the unlocking position, while allowing the rotation of the mode-selection knob from the second position to the third position.
- the locking finger has an end face and a second side face opposite said first side face and wherein a said second stop is arranged, in the radial direction, between the first stop and the end face of the locking finger when the operating member is in the locking position and; in the transverse direction, opposite at least a part of a second side face of the locking finger, when the operating member is in the unlocking position.
- the projection is a rib which has a circular arc shape in a plane of the holder, said arc being centred on the axis of rotation.
- the operating member comprises a lever pivotally mounted with respect to the mode-selector knob about a first pivot axis, the first pivot axis being parallel to the axis of rotation; and wherein the mode-selector knob has a bottom extending perpendicular to the axis of rotation and a peripheral rim having a through-opening, and wherein at least a portion of the lever extends through the through-opening.

the mode-selection button has a bottom extending perpendicularly to the axis of rotation and a peripheral rim, said peripheral rim being provided with a through cut-out forming a tongue connected to a part of the peripheral rim by an axial portion; said tongue being capable of pivoting with respect to a pivoting axis parallel to the axis of rotation by plastic deformation of said axial portion of the peripheral rim.

Said through cut comprises a first cut-out part that extends in a transverse direction, and a second cut-out part that extends in the direction of the axis of rotation, the second cut-out part extends the first cut-out part and opens out of the mode-selection knob.

the mode-selection button has a bottom extending perpendicularly to the axis of rotation and a peripheral rim provided with a through-hole, and wherein the operating member comprises a push button having a head provided with an operating area, said head being arranged in the through-hole, the push button being slidable in a radial direction relative to the peripheral rim when the user presses said operating area.

the locking finger is disposed between a portion of the push button and the holder in the direction of the axis of rotation; said locking finger being attached to the push button so that sliding the push button causes the locking finger to move in the radial direction Y.

The locking/unlocking system comprises a support wall integral with the mode-selection button, and a resilient element adapted to act between the push button and said support wall to hold the push button in a locking position.

The support wall extends past an end face of the push button and past the end face of the locking finger, said support wall forming the first stop.

DETAILED DESCRIPTION OF THE INVENTION

The drawings and the description below contain, for the most part, elements of a definite nature. They may therefore not only serve to improve understanding of this disclosure, but also contribute to its definition, where appropriate. In this patent application, the terms "lower" and "upper" are defined in relation to the figures.

Figure 1:
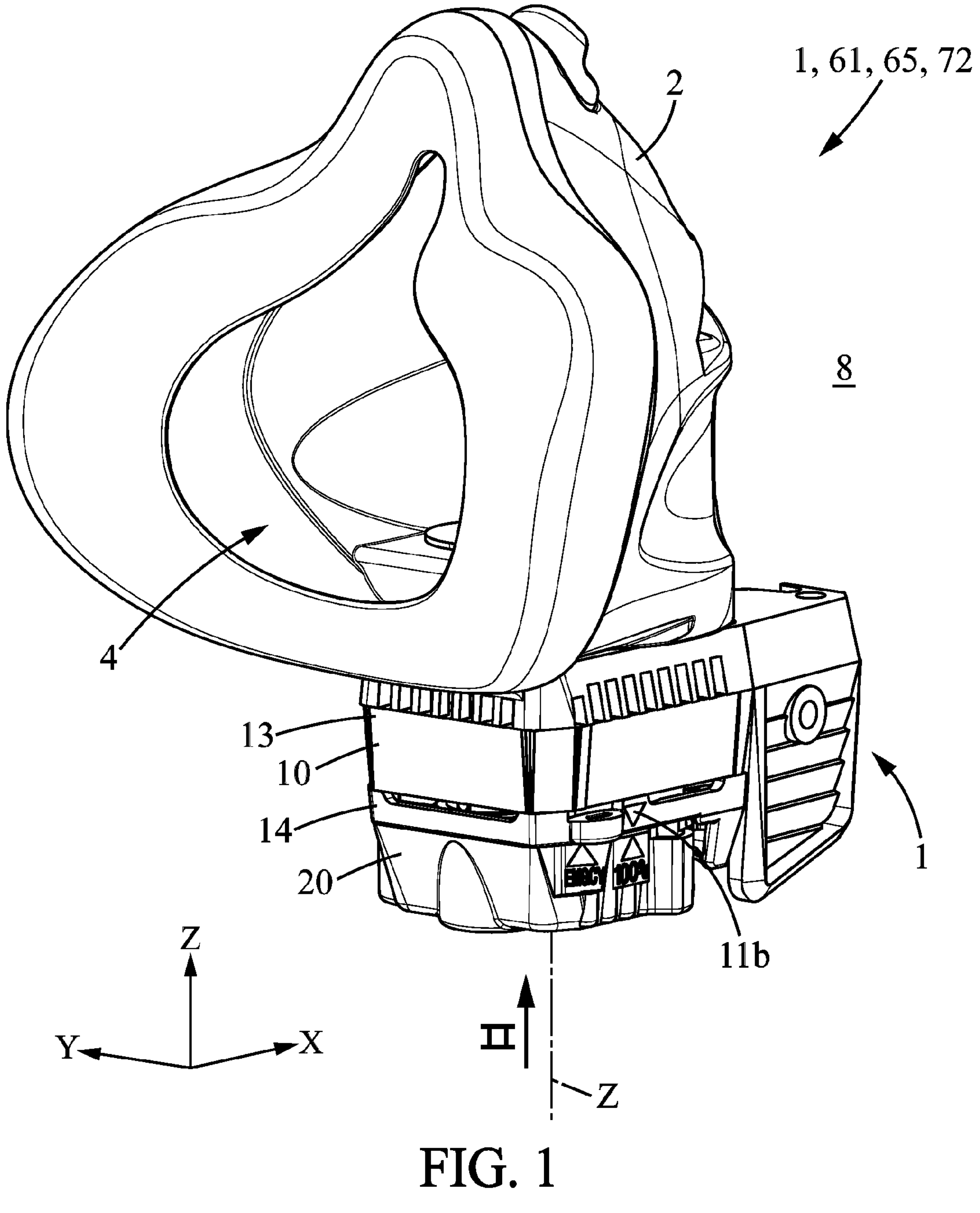
FIG. 1 is a perspective view of a breathing mask with a control unit according to the present invention.

FIG. 1 illustrates a breathing mask 1 arranged in a pressurised cabin 8 of a commercial aircraft intended to carry crew members and usually also passengers. A device, preferably of the so-called isobaric type, pressurises the cabin so that it is not lower than a pressurisation pressure, generally corresponding to an altitude of between 1500 metres and 2400 metres. As the aircraft rises, the pressure in the cabin is approximately equal to the pressure outside the cabin and decreases, until it reaches said pressurisation pressure. Under normal conditions, the pressure in the cabin is then kept constant until the pressure outside the cabin becomes lower than the pressurisation pressure. The purpose of the breathing mask is to provide the user with sufficient oxygen and protection from harmful substances in the event of incidents, such as depressurisation, toxic gases or the like, which prevent the cabin occupants from breathing normally.

The breathing mask 1 comprises a face cover 2 and a control unit 1 according to a first embodiment of the invention.

The oronasal face cover 2 is intended to be applied substantially tightly to a user's face around their nose and mouth. The oronasal cover 2 has a breathing cavity 4 wherein the user breathes.

The control unit 1 according to the first mode of implementation comprises a holder 10, a controller, a mode-selection knob 20 pivotally mounted on the holder 10 about an axis of rotation Z and a device for locking/unlocking the rotation of the selection knob.

In the present application, "radial direction", "transverse direction" and "axial direction" are defined with respect to the axis of rotation Z. The transverse direction X, the radial direction Y and the axis of rotation Z form a direct trihedron. The transverse direction X and the radial direction Y are contained in a plane parallel to the holder.

Figure 2:
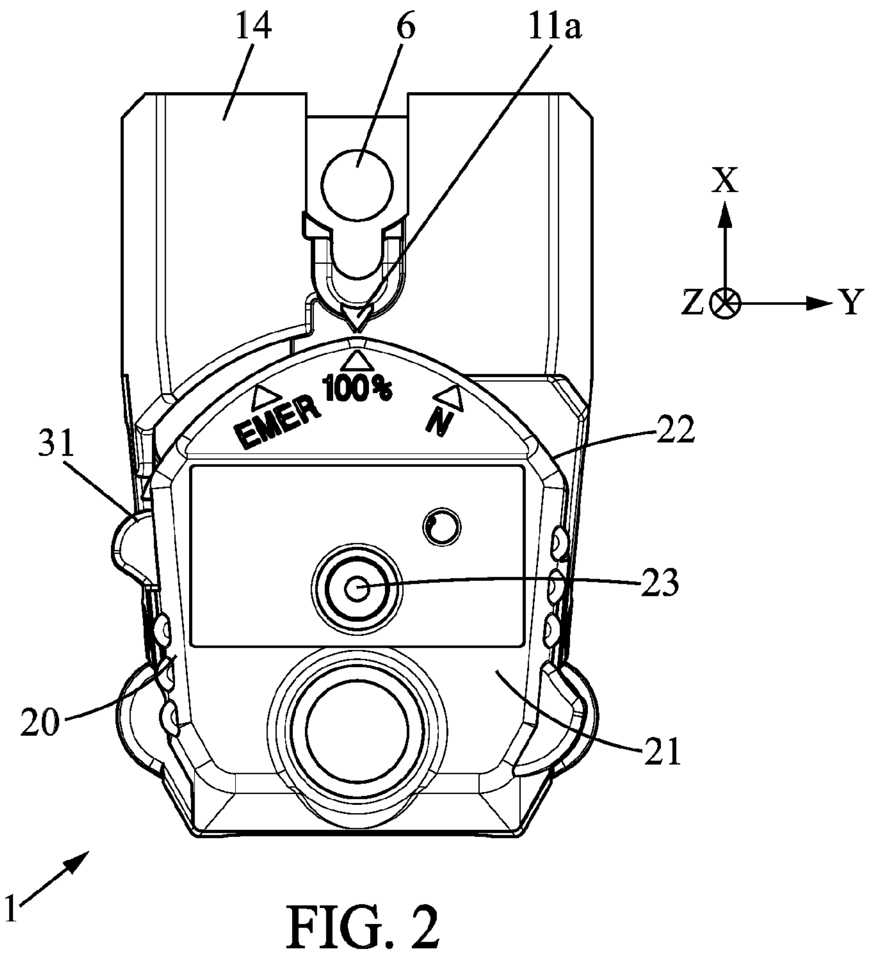
FIG. 2 is a view of one side of the control unit according to the invention, said side being marked with arrow II in FIG. 1.

In the embodiment shown in FIGS. 1 and 2, the holder 10 comprises a housing 13 and a cover 14 suitable for closing the housing. The housing 13 is provided with a breathing gas supply port 6 visible in FIG. 2. This port 6 is intended to receive the end of a hose to connect the controller to a source of breathing gas containing primarily oxygen.

The controller is housed in the housing 13. It operates in three modes. In the first operating mode, called "EMERGENCY" mode, the controller supplies the breathing cavity 4 with breathing gas only until a slight overpressure is reached in the breathing cavity 4 compared to the ambient pressure of the cabin air, generally this overpressure is between 3 mbar and 30 mbar. In the most common overpressure values, between 3 and 7 mbar, this overpressure value is hardly felt by the user. Above 10 to 12 mbar, the overpressure requires a substantial additional effort from the user to breathe which is quickly felt by the user.

In the second mode of operation, referred to as "100% mode", the controller supplies the breathing cavity 4 only with breathing gas until it reaches approximately ambient pressure. In practice, it is usually useful to plan to stop the supply to the breathing cavity before the breathing cavity reaches ambient pressure, so that there is a very slight depression (a few tenths of a mbar to a few mbar) in the breathing cavity 4

The third breathing mode, known as "NORMAL", differs from the second breathing mode in that the breathing cavity 4 is supplied with breathing gas diluted with air, generally ambient air, the proportion of which is usually a function of the pressure in the cabin 8.

With reference to FIG. 2, the mode-selector switch 20 has a first position marked “EMER” and commands the controller to operate in the first mode. The mode-selector switch 20 has a second position marked “100%” and commands the controller to operate in the second mode. The mode-selector switch 20 has a second position marked “N” and commands the controller to operate in the second mode. The middle position of the selector switch corresponds to the second 100% position. In the embodiment shown in FIG. 2, the third position “N” is located to the right of the centre position. Thus, when viewed from the front, the mode-selection knob 20 must be rotated counter-clockwise from the second 100% position to the third N position.

In the illustrated embodiment, the axis of rotation Z of the selection knob extends substantially vertically when the user holds his or her head vertically, so that the mode-selection knob 20 extends below the holder 10. Of course, the mode-selection button 20 could be placed differently, in particular on the front of the holder 10 and/or with an axis of rotation extending substantially horizontally. In a known way, the three positions of the mode-selection button are discrete positions marked by notches. The mode-selector switch 20 has a bottom 21, a peripheral rim 22 surrounding the bottom and a rod 23 for attachment to the holder 10. The bottom 21 comprises a hole surrounded by an axial ring 24 shown in FIG. 4. The attachment rod 23 is arranged in the orifice. It forms the Z-axis of rotation of the selection knob 20.

In the embodiment shown, EMER, 100% and N are marked on the bottom 21 and on the peripheral rim 22 of the selection button. A marker 11*a* is located at the centre of the width of the cover 14 and two side markers 11*b* are located at the edges of the housing 13 to show the position of the mode-selector switch 20. Only one side marker 11*b* is visible in FIG. 1.

The locking/unlocking system 30 is adapted to lock and unlock the rotation of the mode-selection knob from the second position 100% to the third position N. The locking/unlocking system 30 comprises an operating member 31 adapted to be moved between a position for locking the rotation of the mode-selection knob 20 towards the third position N, and a position for unlocking the rotation of the mode-selection knob 20 towards the third position N.

Figure 3:
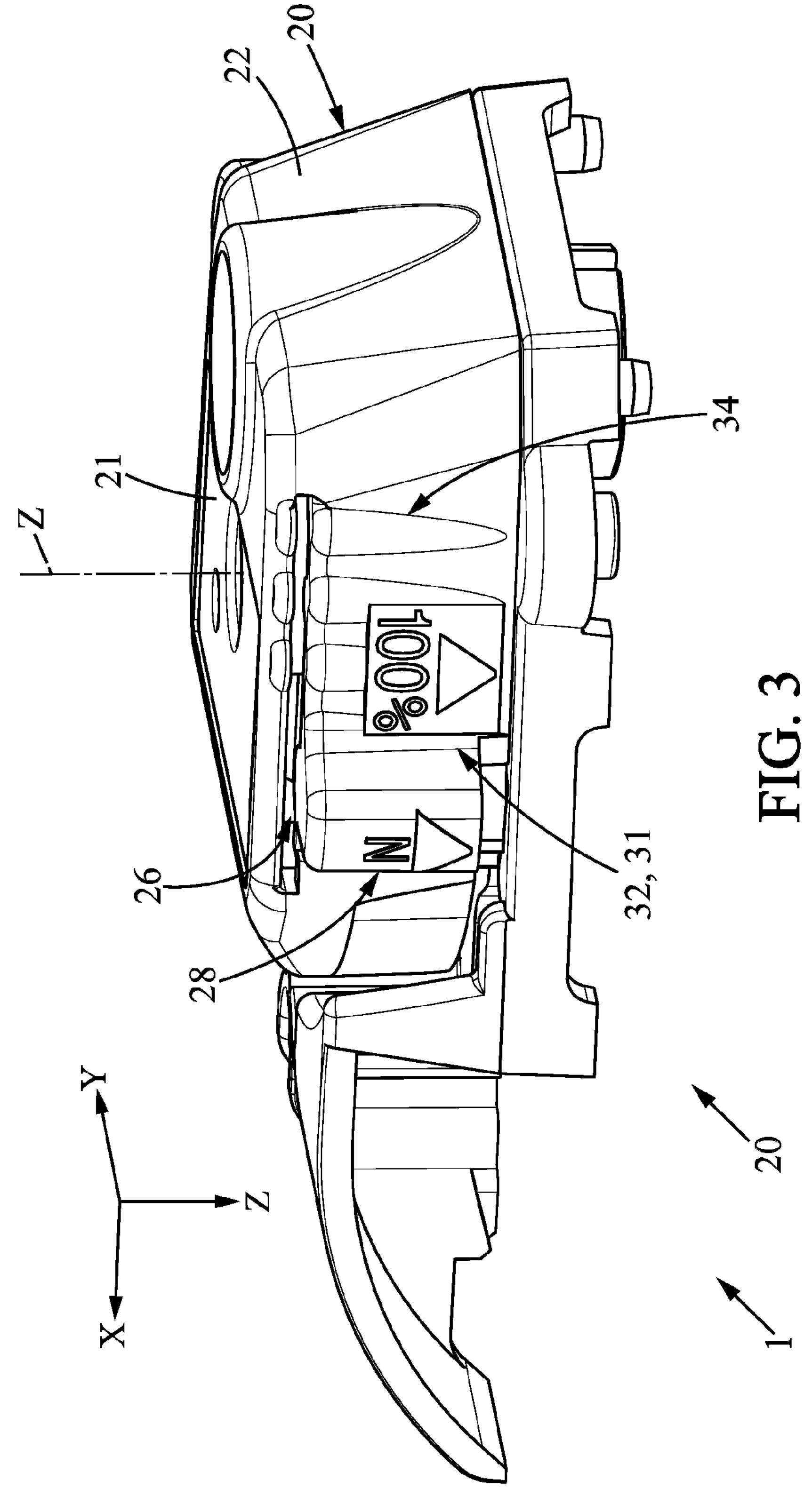
FIG. 3 is a side perspective view of a mode-selection knob and cover of the control unit according to a first embodiment of the invention.

With reference to FIG. 3, the operating member 31 comprises a tab 32 formed by a through cut-out in the peripheral rim 22 of the mode-selector button 20. The tab 32 is adapted to pivot inwardly of the button about a pivot axis parallel to the axis of rotation Z by plastic deformation of an axial portion 34 of the peripheral rim. Thus, in this embodiment, the mode-selector switch 20 is made of a plastic material that can be deformed, such as a polyamide. Advantageously, the through cut has a first cut-out part 26 that extends in the transverse direction X and a second cut-out part 28 that extends in the direction of the axis of rotation Z. The second cut-out part 28 extends the first cut-out part 26 and opens out of the mode-selection knob. The tab 32 thus formed is connected to the rest of the peripheral rim 20 of the button by the axial portion 34. This tab 32 constitutes the operating member 31 of the locking/unlocking system. The operating member 31 is thus pivotable relative to the axial portion 34 of the peripheral rim 22 between a locking position, wherein the operating member 31 extends in line with the peripheral rim 22, as illustrated in FIGS. 3 and 4; and an unlocking position wherein the operating member 31 is arranged within the mode-selector button 20.

Figure 4:
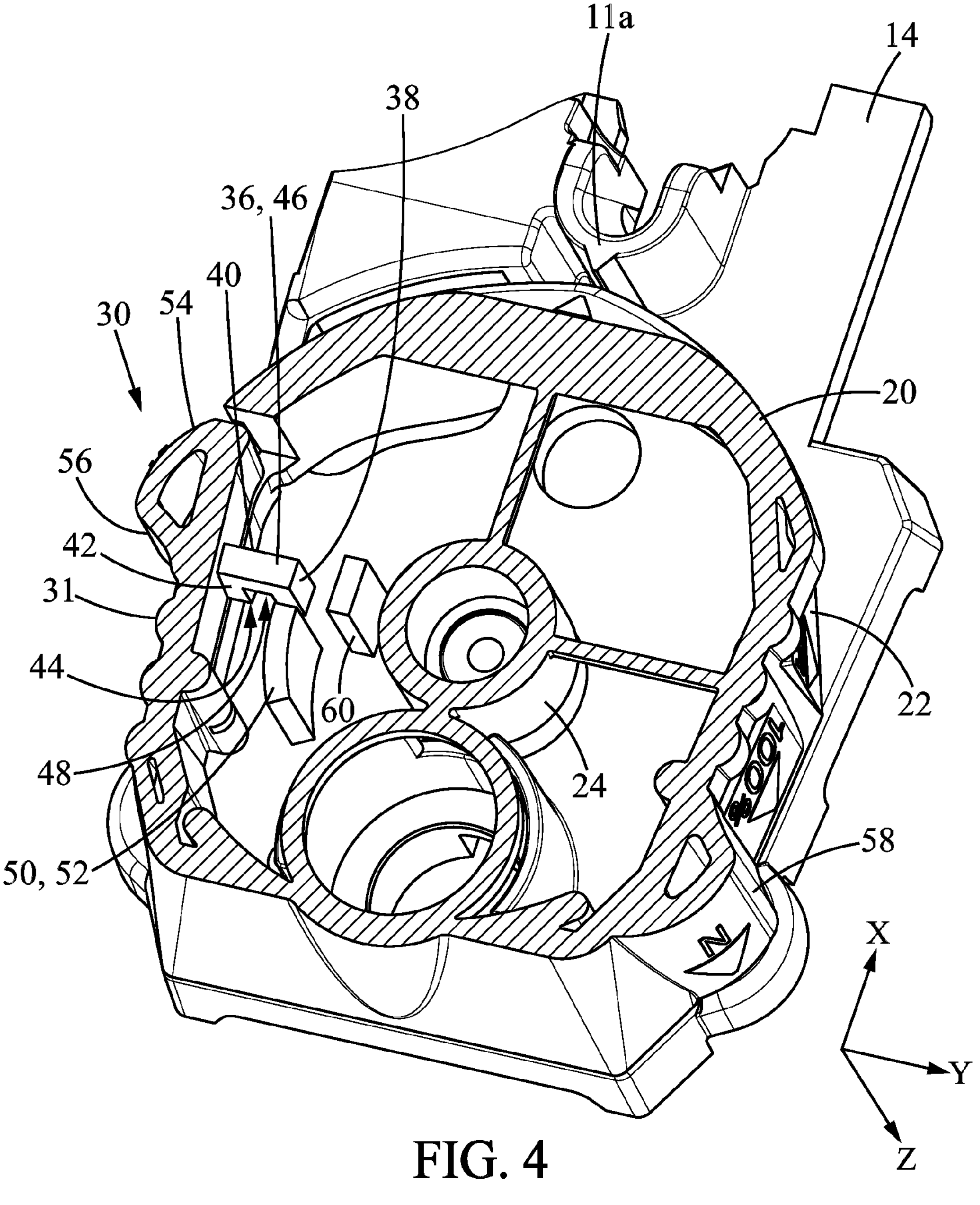
FIG. 4 is a perspective view of a portion of a cross-section of the mode selection knob and cover of the control unit according to a first embodiment of the invention.

With reference to FIG. 4, the operating member 31 further comprises a locking finger 36 attached to its inner side. The locking finger 36 extends substantially in the radial direction Y with respect to the axis of rotation Z. The locking finger 36 has a free end face 38, a first side face 40, and a second side face 42 opposite the first side face, a bottom face 44 facing the cover 14 and an upper face 46 opposite the lower face. The locking finger 36 is provided with a groove 48 extending substantially transversely thereto. The groove 48 is open on the underside 44 and opens onto the two side faces 40, 42 of the locking finger.

The locking/unlocking system 30 also has a projection 50 carried by the holder 14. The projection 50 is adapted to abut against the first side face 42 of the locking finger to lock the rotation of the mode-selector knob 20 to the third position N, when the operating member 31 is in the locking position as shown in FIGS. 3 and 4. The first side face 42 has a normal vector directed in the same direction as the direction of rotation of the mode-selection knob 20 from the second position 100% to the third position N. When the operating member 31 is rotated to the unlocking position and the user rotates the mode-selector knob about the axis of rotation Z in a counter-clockwise direction, the projection 50 engages the groove 48 of the locking finger thereby allowing the mode-selector knob 20 to rotate to the third position N.

In the illustrated embodiment, the projection 50 is formed by a rib 52 which extends in the shape of a circular arc in the plane of the holder 10. The circular arc shape is centred on the Z axis of rotation. The rib 52 is arranged on the same side of the locking finger 36 as the side of the first position EMER to the second position 100%. In the illustrated embodiment, the rib 52 extends over an angular sector substantially equal to the angular sector separating the second position 100% from the third position N.

In the illustrated embodiment, the outer face of the operating member 31 is provided with a first protruding portion 54 comprising an operating area 56 which the user is able to press to rotate the operating member 31 from the locking position to the unlocking position. The mode-selector switch 20 further has a second projecting portion 58 diametrically opposite the first projecting portion 54 with respect to the axis of rotation Z. The first protruding portion 54 and the second protruding portion 58 are intended to facilitate recognition of the position of the selection button 20 relative to the holder 10 by touch.

Advantageously, the locking/unlocking system 30 of the control unit also comprises a first stop 60 capable of stopping the pivoting of the operating member 31 when the groove 48 of the locking finger is arranged in front of the projection 50. The first stop 60 is arranged on the cover 14 in front of the free end 38 of the locking finger. The first stop 60 is located at a distance from the projection 50 substantially equal to the distance between the groove 48 and the end face 38 of the locking finger. The first stop 60 is, for example, formed by a wall which extends perpendicularly to the holder 10 along a transverse direction X.

Advantageously, the first radial stop 60 facilitates the passage to the third position N because the pressure on the operating member 31 is limited and allows the mode-selection knob 20 to be turned quickly to the third position N. In operation, the mode-selection knob 20 is generally positioned in the second position 100%. If the user turns the mode-selector knob 20 clockwise, it will select the first EMER position. In this embodiment, the rotation from the second 100% position to the first EMER position can be performed by pressing or not pressing the operating member 31. If the user turns the mode-selector knob 20 counter-clockwise without pressing on the operating area 56 of the operating member, the first side face 42 of the locking finger comes into abutment with the projection 50. Thus, the first side face 42 of the locking finger and the projection 50 lock the rotation of the mode-selection knob to the third position N. If the user wishes to select the third position N, the user must press the operating area 56 of the operating member 31 and then turn the mode-selector knob in a counter-clockwise direction. The operating member 31 is pivoted by this holder, the locking finger 36 is moved in a radial direction Y until it comes to rest against the first stop 60. The groove 48 then faces the projection 50. The first side face 42 no longer opposes rotation of the mode-selector knob 20 in a counter-clockwise direction. The user can turn the mode-selection knob 20 counter-clockwise to the third position N. Thus, advantageously, the locking/unlocking system 30 according to the present invention prevents an accidental selection of the third mode N. The user of the oxygen mask must necessarily make an additional voluntary action—namely press the operating member 31—in order to be able to select the third mode of operation of the A control unit. This voluntary action reduces the risk of unintentional positioning of the mode-selector switch in the third position N.

Figure 5:
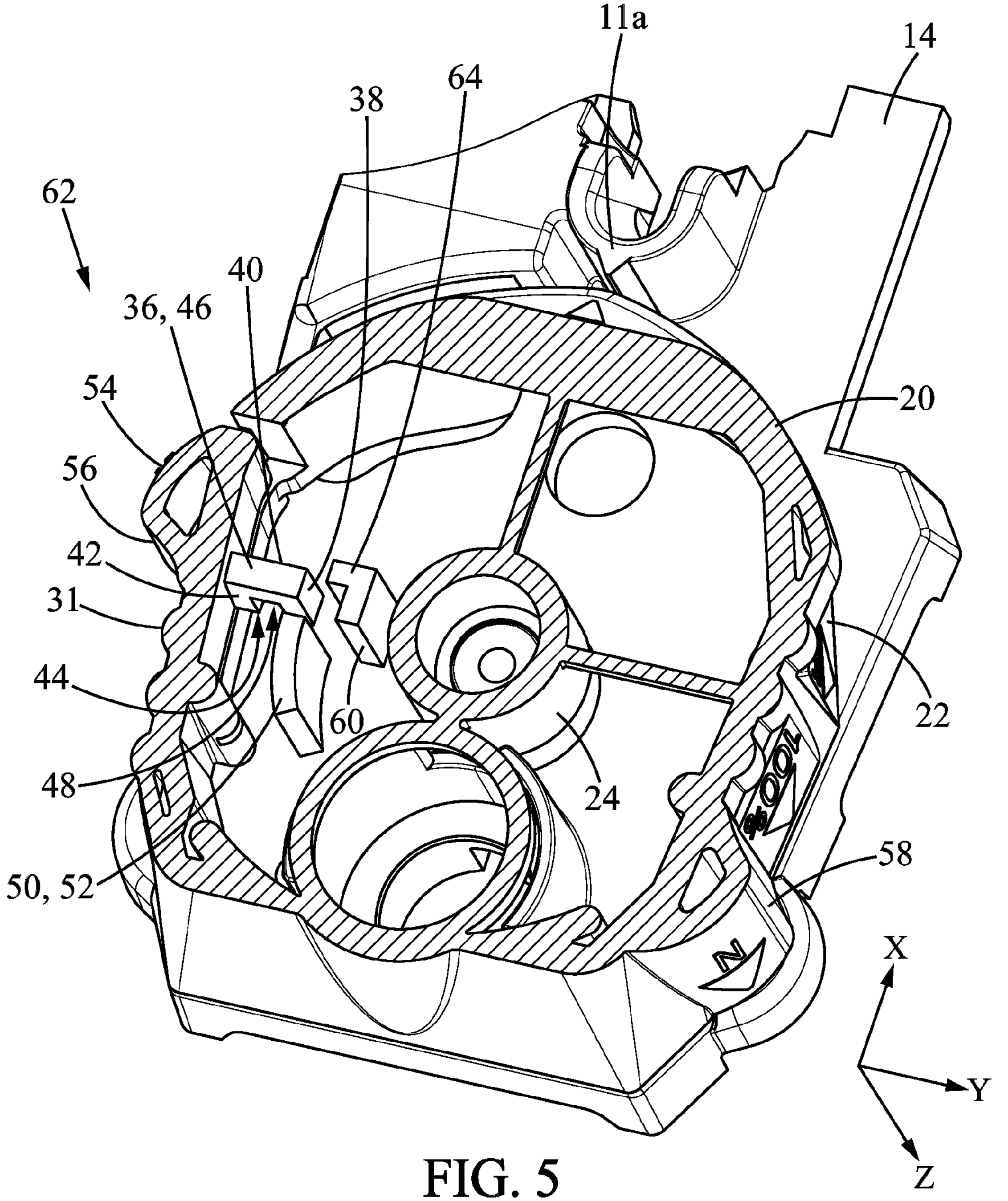
FIG. 5 is a perspective view of a portion of a cross-section of the mode-selection knob and cover according to a first variant of the first embodiment of the control unit according to the invention.

FIG. 5 shows a mode-selector switch and a cover of a first variant 61 of the control unit according to the first embodiment of the invention. The locking/unlocking system 62 of this first embodiment is similar to the locking/unlocking system 30 of the control unit according to the first embodiment of the invention except that the cover 14 additionally comprises a second stop 64. The other elements of the locking/unlocking system 62 according to this variant are identical to the elements of the locking/unlocking system 30 according to the first mode illustrated in FIGS. 3 and 4. They have the same references and will not be described a second time. The second stop 64 is carried by the cover 14. It is adapted to stop the rotation of the mode-selection knob 20 clockwise towards the first EMER position when the operating member 31 is in an unlocking position, i.e. when the operating member 31 is pushed into the housing 13.

The second stop 64 extends in the radial direction Y parallel to the locking finger 36. It is offset from the locking finger 36 in the transverse direction X. It is arranged between the first stop 60 and the end face 38 of the locking finger when the operating member 31 is in a locking position. It is positioned offset from the locking finger 36 along the transverse direction X. It is located opposite at least part of the second lateral face 40 of the locking finger, when the operating member 31 is in the unlocking position. In the illustrated embodiment, the second stop 64 is integral with the first stop 60. It extends radially towards the operating member 31. The second side face 40 of the locking finger is adapted to abut against the second stop 64 when the operating member 31 is in the unlocking position and the mode-selection knob 20 is rotated to the first EMER position. In this first variant 61, the rotation from the second position 100% to the first position EMER can only be carried out when the user does not press the operating area 56 of the operating member.

Figure 6:
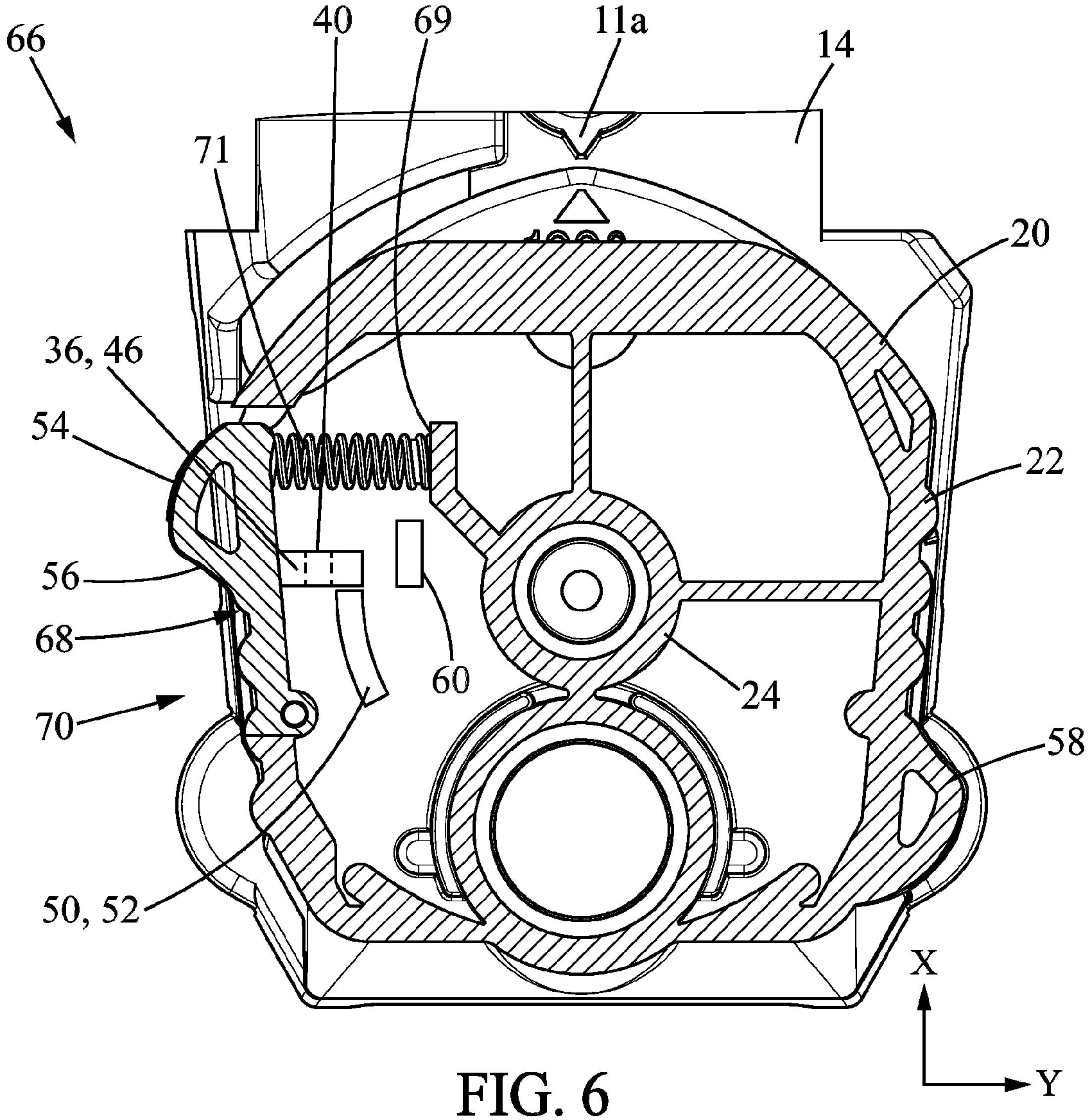
FIG. 6 is a perspective view of a portion of a cross-section of the mode-selection knob and cover according to a first variant of the first embodiment of the control unit according to the invention.

FIG. 6 shows a mode-selector switch and a cover of a first variant 65 of the control unit according to the first embodiment of the invention. The locking/unlocking system 66 of the unit according to this second variant is similar to the locking/unlocking system 30 of the control unit according to the first mode of implementation of the invention except that the operating member 31 is not made by a tab 32 formed in the peripheral rim 22 but by an independent lever 68 and that the locking/unlocking system 66 further comprises a support wall 69 fixed to the axial ring 24 of the mode-selection button and a spring 71 arranged between the lever 68 and the support wall 69. The spring 71 is suitable for holding the lever in the locking position of the rotation of the mode-selector switch to the third position. The other elements of the locking/unlocking system 62 according to this variant are identical to the elements of the locking/unlocking system 30 according to the first mode illustrated in FIGS. 3 and 4. They have the same references and will not be described a second time.

In this second embodiment, a side portion of the peripheral rim 22 has a through-opening 70 of substantially rectangular shape. The lever 68 is arranged in the mode-selection knob. It is pivotally mounted about a pivot axis X-X. The lever 68 is suitable for passing through the through-opening 70. The support wall 69 extends in a plane (X, Z) parallel to the rib 52. It is attached to the axial ring 24 by means of an intermediate branch. The support wall 69 and the spring 71 are arranged in a space on the side of the first side face 40, above the locking finger 36. The spring 71 is mounted against the inside of the lever 68. A locking finger 36 identical to the locking finger 36 of the operating member according to the first embodiment is attached to the lever 68 and extends in the radial direction Y. The lever 68 has a first projecting portion 54 with an operating area 56. In a variant not shown, the support wall 69 and the spring 71 are arranged in a space on the side of the second side face 42, below the locking finger 36. In this case, the spring 71 exerts a force on a portion of the lever adjacent to the pivot axis X-X.

The function of the locking/unlocking system 66 in the second embodiment is identical to the function of the locking/unlocking system 30 in the first embodiment and will not be described again.

Figure 7:
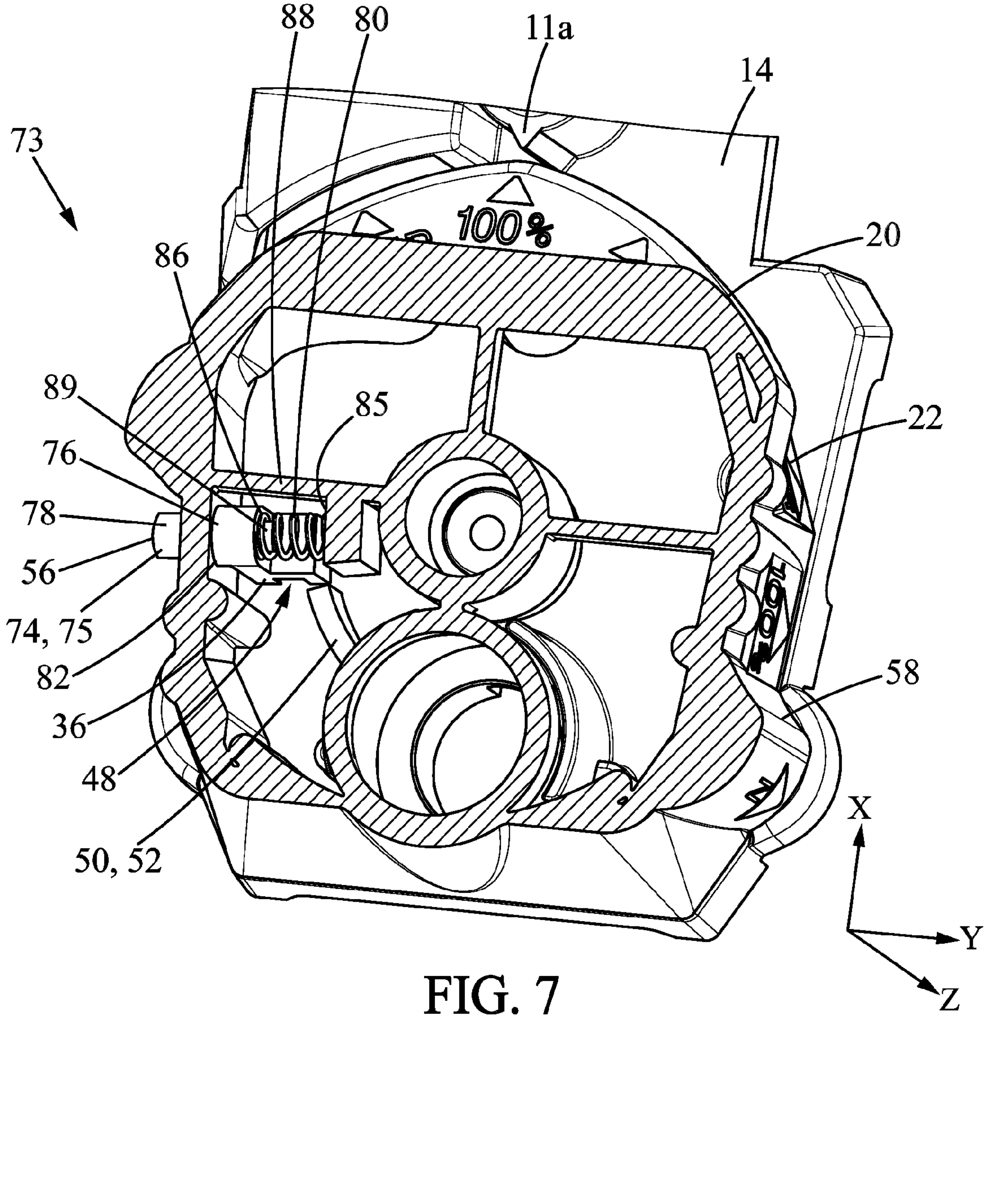
FIG. 7 is a perspective view of a portion of a cross-section of a mode-selection knob and cover of the control unit according to a second embodiment of the invention.

FIG. 7 shows a mode-selector switch and cover of a control unit 72 according to a second embodiment of the invention. This control unit 72 comprises a locking/unlocking system 73 with a projection 50 and an operating member 74. The projection 50 is identical to the projection 50 of the locking/unlocking system according to the first embodiment and will not be described a second time.

The operating member 74 comprises a push button 75, a locking finger 36 and a resilient element 80 adapted to hold the push button in a locking position.

The push button 75 has a main body 76 and a head 78 which is integral with the main body and has a smaller dimension than the main body 76. The push button 75 has a bearing face 82 arranged between the main body and the head. In the illustrated embodiment, the main body 76 and the head 78 are cylindrical. The bearing face 82 is annular. The head 78 is located in a through-hole 84 in the peripheral rim 22 of the mode-selector switch 20.

The resilient element 80 is adapted to hold the bearing face 82 against the inner face of the peripheral rim 22 so that the head 78 is held outside the mode-selector button 20 in the mode-selector button locking position. The resilient element 80 is, for example, a compression spring. The resilient element 80 is arranged between an end face 86 of the main body and a support wall 85 integral with the mode-selector switch 20. In the illustrated embodiment, the support wall is attached to a beam 88 connecting the peripheral rim 22 to the axial ring 24. The support wall 85 extends in a plane perpendicular to the radial direction Y. The support wall 85 extends flush with the end face 86 of the cylindrical body.

Advantageously, in the embodiment shown, the end face 86 is provided with a pin 89 forming a guide for a part of the resilient element.

The push button axis 75 extends in the radial direction Y. Thus, the push button 75 is adapted to slide in the radial direction Y with respect to the peripheral rim 22, when the user presses the end face of the head 78. This end face of the head 78 forms an operating area 56.

The locking finger 36 is fixed to the main body 76. The locking finger 36 extends in the direction of the radial axis Y. Advantageously, the locking finger is arranged, in the direction of the axis of rotation Z, between the holder 14 and a part of the push button 75. Radial displacement of the push button 75 relative to the peripheral rim 22 causes radial displacement of the locking finger. The locking finger 36 is similar to the locking finger of the operating member 31 according to the first embodiment. In particular, the locking finger 36 has a free end face 38, a first side face 42, a second side face 40 opposite the first side face, and a bottom face 44 facing the cover 14. The locking finger 36 is provided with a groove 48 extending substantially transversely thereto. The groove 48 is open on the underside 44 and opens onto the two side faces 40, 42 of the locking finger.

The support wall 85 extends in line with the end face 38 of the locking finger. It constitutes both a support wall for one end of the elastic element 80 and at the same time a first stop 60 against which the locking finger comes to rest when the groove 48 is opposite the projection 50.

At rest, the resilient element 80 holds the push button 75 in a position to lock the rotation to the third position N as shown in FIG. 7. In this position, the first side face 42 of the locking finger abuts the projection 50 and locks the rotation of the mode-selector button 20 to the third position N. When the user presses the push-button head, the push button 75 slides into the through-hole 72 and the resilient element 80 compresses until the locking finger 36 abuts the portion of the support wall 85 forming the first stop 60. Then, when the user rotates the mode-selector knob 20 about the axis of rotation Z, the projection 50 passes through the groove 48 of the locking finger allowing the mode-selector knob 20 to rotate to the third position N.

The invention claimed is:

1. A control unit for an aircraft crew member breathing mask, said unit comprising:

a holder;

a mode-selection knob pivotally mounted on the holder with respect to an axis of rotation, the axis of rotation being arranged perpendicular to said support; a radial direction, a transverse direction and the axis of rotation forming a direct trihedron; said selection knob being pivotable between at least a first position, a second position and a third position, the second position being positioned between the first position and the third position;

a controller configured to be supplied by a source of breathing gas and to supply a breathing cavity in at least the following three modes of operation:

a) when the mode-selection knob is in the first position, breathing gas is introduced into the breathing cavity until a pressure in the breathing cavity exceeds a first pressure relative to an ambient pressure, b) when the mode-selection knob is in the second position, the controller supplies the breathing cavity as long as the pressure in the breathing cavity is not higher than a second pressure relative to the ambient pressure, the first pressure being higher than the second pressure, c) when the mode-selection knob is in the third position, the controller supplies the breathing cavity with breathing gas diluted with air, wherein the control unit further comprises at least one locking/unlocking system selectively locking and/or unlocking the rotation of the mode-selection knob; the locking/unlocking system comprising an operating member moveable between a locking position and an unlocking position; the locking position blocking rotation of the mode-selection knob from the second position to the third position while allowing rotation of the mode-selection knob from the first position to the second position, the unlocking position allowing rotation of the mode-selection knob from the second position to the third position.

2. The control unit according to claim 1, wherein the operating member comprises a locking finger extending in the radial direction, the locking finger comprising a transverse groove, and wherein the locking/unlocking system further comprises a projection carried by said holder, said projection being configured to come into abutment against a first face of the locking finger to lock the rotation towards the third position, when the operating member is in the locking position; the projection being suitable to pass through the groove to allow rotation of the mode-selection knob towards the third position, when the operating member is in the unlocking position.

3. The control unit according to claim 2, wherein the operating member is configured to move in the radial direction, after pressing on an operating area of the operating member and wherein the locking/unlocking system comprises a first stop configured to stop movement of the operating member when the groove is opposite the projection.

4. The control unit according to claim 3, wherein the first stop is arranged in front of an end face of the locking finger at a distance from the projection equal to the distance between the groove and the end face of the locking finger.

5. The control unit according to claim 3, wherein the first stop is arranged on the holder.

6. The control unit according to claim 3, wherein the locking/unlocking system comprises a second stop configured to stop the rotation of the mode-selection knob from the second position to the first position, when the operating member is in the unlocking position, while allowing the rotation of the mode-selection knob from the second position to the third position.

7. The control unit according to claim 6, wherein the locking finger has an end face and a second side face opposite said first side face and wherein said second end stop is arranged, in the radial direction, between the first stop and the end face of the locking finger when the operating member is in the locking position and; in the transverse direction, opposite at least part of the second side face of the locking finger, when the operating member is in the unlocking position.

8. The control unit according to claim 2, wherein the projection is a rib which has a circular arc shape in a plane of the support, said circular arc being centered on the axis of rotation.

9. The control unit according to claim 2, wherein the mode-selection knob has a bottom extending perpendicularly to the axis of rotation and a peripheral rim provided with a through-hole, and wherein the operating member comprises a push button having a head provided with an operating area, said head being arranged in the through-hole, the push button being slidable in the radial direction with respect to the peripheral rim when the user presses said operating area.

10. The control unit according to claim 9, wherein the locking finger is disposed between a portion of the push button and the holder in the direction of the axis of rotation; said locking finger being attached to the push button such that sliding of the push button causes the locking finger to move in the radial direction.

11. The control unit according to claim 9, wherein the locking/unlocking system comprises a support wall integral with the mode-selection knob, and a resilient element configured to act between the push button and said support wall to hold the push button in the locking position.

12. The control unit according to claim 11, wherein the first stop is arranged in front of an end face of the locking finger at a distance from the projection equal to the distance between the groove and the end face of the locking finger and wherein the support wall extends in front of an end face of the push button and in front of the end face of the locking finger, said support wall forming the first stop.

13. The control unit according to claim 1, wherein the operating member comprises a lever pivotally mounted with respect to the mode-selection knob about a first pivot axis, the first pivot axis being parallel to the axis of rotation; and wherein the mode selection knob has a bottom extending perpendicular to the axis of rotation and a peripheral rim having a through-opening, and wherein at least a portion of the lever extends through the through-opening.

14. The control unit according to claim 1, wherein the mode-selection knob has a bottom extending perpendicularly to the axis of rotation and a peripheral rim, said peripheral rim being provided with a through cut-out forming a tongue connected to a part of the peripheral rim by an axial portion; said tongue being configured to pivot about a pivot axis parallel to the axis of rotation by plastic deformation of said axial portion of the peripheral rim.

15. The control unit according to claim 14, wherein said through cut-out comprises a first cut-out part which extends in the transverse direction, and a second cut-out part which extends in the direction of the axis of rotation, the second cut-out part is an extension of the first cut-out part and opens outside the mode-selection knob.

* * * * *